United States Patent [19]

Sherman et al.

[11] Patent Number: 5,175,830
[45] Date of Patent: Dec. 29, 1992

[54] METHOD FOR EXECUTING OVERLAYS IN AN EXPANDED MEMORY DATA PROCESSING SYSTEM

[75] Inventors: Arthur M. Sherman, Morgan Hill; Lonnie S. Walling, Ben Lomond, both of Calif.

[73] Assignee: International Business Machines Corporation, Armonk, N.Y.

[21] Appl. No.: 367,838

[22] Filed: Jun. 16, 1989

[51] Int. Cl.⁵ .......................................... G06F 12/02
[52] U.S. Cl. .................................... 395/400; 395/425; 364/DIG. 1
[58] Field of Search ... 364/200 MS File, 900 MS File; 395/400 MS File, 425 MS File

[56] References Cited

U.S. PATENT DOCUMENTS

| 4,080,651 | 3/1978 | Cronshaw et al. | 364/200 |
|---|---|---|---|
| 4,403,283 | 9/1983 | Myntti et al. | 364/200 |
| 4,410,940 | 10/1983 | Carlson et al. | 364/200 |
| 4,926,322 | 5/1990 | Stimac et al. | 364/200 |

FOREIGN PATENT DOCUMENTS 62-251851 2/1987 Japan .
63-257034 10/1988 Japan .

OTHER PUBLICATIONS

"Expanded Memory: Writing Programs that Break the 640k Barrier", Hansen et al., Microsoft Systems Journal, Mar. 1987, pp. 21-32.
IBM Technical Disclosure Bulletin, vol. 28, No. 12, May 1986, New York, U.S., pp. 5615-5620; "Overlay Linker and Loader Process".
IBM Technical Disclosure Bulletin, vol. 16, No. 11, Apr. 1974, New York, U.S., p. 3626; Doggett: "Reentrant Variable Initialization".
"Disk Operating System Technical Reference 6138536", Feb. 1985, published by the IBM Corporation, Chapter 10, "EXE File Structure and Loading".
"Reaching Into Expanded Memory" PC Tech Journal May 1987.

Primary Examiner—Stuart S. Levy
Assistant Examiner—Reba I. Elmore
Attorney, Agent, or Firm—Perman & Green

[57] ABSTRACT

A method includes the steps of differentiating Overlays each into a code portion and into a data portion, storing the data portions within a CPU directly-accessible memory, storing the code portions within a memory not-directly accessible by the CPU, and swapping a required code portion into the directly-accessible memory for execution by the CPU such that the swapped-in code portion has access to a plurality of the data portions stored within the directly-accessible memory.

16 Claims, 2 Drawing Sheets

METHOD FOR EXECUTING OVERLAYS IN AN EXPANDED MEMORY DATA PROCESSING SYSTEM

FIELD OF THE INVENTION

This invention relates generally to methods of operating data processing apparatus and, in particular, relates to a method of managing the swapping of code associated with overlays into and out of an area within a main memory while maintaining non-swappable data for each of the overlays within another area of the main memory.

BACKGROUND OF THE INVENTION

A problem in CPU-constrained main memories relates to an inability of multiple code overlays to swap into and out of a single area within RAM while each overlay also maintains a non-swappable data area within the RAM. As employed herein, the phrase "CPU-constrained main memory" is intended to mean a memory the usage of which is restrained by the addressing capabilities of the CPU. Such a separation between code and data, with the code being swappable and the data operated on by the code being non-swappable, would allow a given procedure within a code swappable overlay to be invoked from anywhere within the system, including other code swappable overlays.

An ability for one swappable overlay to invoke a procedure from another swappable overlay would provide a number of benefits. Typically, because a calling overlay is completely swapped out by the called overlay, the called overlay has no access to any data within the caller, including the caller's stack. This situation severely limits the type of procedures that can be added to an overlay.

It is therefore an object of the invention to provide in a data processing system having a CPU-constrained main memory a method whereby a swappable overlay is enabled to invoke a procedure from another swappable overlay.

It is another object of the invention to provide in a main memory constrained data processing system a process whereby multiple code overlays are swapped into and out of a single area within the main memory while each overlay also maintains a non-swappable data area within the main memory.

It is a further object of the invention to provide in a main memory constrained data processing system a process whereby a called overlay that is swapped into a main memory has access to data associated with a calling, swapped out overlay, including the calling overlay's stack.

SUMMARY OF THE INVENTION

The foregoing problems are overcome and the objects of the invention are realized by a method of managing the storage of overlays before the execution thereof. The method is disclosed for use in a data processing system having a CPU coupled to a first, directly accessible main memory, the main memory storing code and data associated with the code. A particular group of code statements and an associated data portion comprise an overlay.

The method includes the steps of differentiating the overlays into a code portion and into a data portion, storing the data portions within the first directly accessible memory, storing the code portions within a second memory that is not-directly accessible by the CPU, and swapping a required code portion into the first memory for execution by the CPU such that the swapped-in code portion has access to a plurality of the data portions stored within the first memory.

In greater detail, the method includes the steps of (a) allocating a code area within the main memory having a number of storage locations sufficient to accommodate a largest executable code portion associated with one or more required overlays, (b) allocating one or more data areas within the main memory each of which has a number of storage locations sufficient to accommodate one data portion associated with each one of the required over (c) allocating one or more areas within an expanded memory, each of the one or more areas having a number of storage locations sufficient to accommodate a code portion of one of the required overlays. The method further includes the steps of, for each of the required overlays, (d) storing the data portion within the allocated data area, (e) storing the code portion within the allocated code area, (f) relocating within the stored code portion any references to data such that the references reflect the data storage location within the associated allocated data area, and (g) copying the stored and relocated code portion to the allocated area within the expanded memory.

BRIEF DESCRIPTION OF THE DRAWING

The above set forth and other features of the invention are made more apparent in the ensuing Detailed Description of the Invention when read in conjunction with the attached Drawing, wherein.

DETAILED DESCRIPTION OF THE INVENTION

Figure 1:
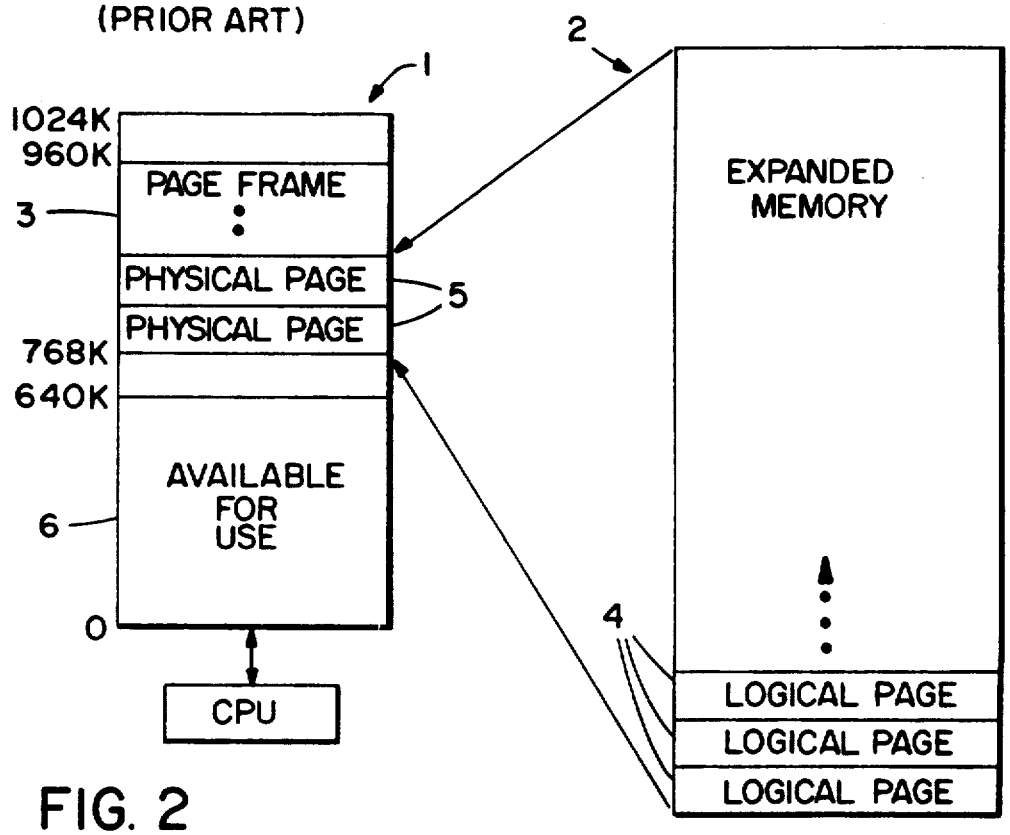
FIG. 1 snows a memory organization of a CPU-constrained main memory having a expanded memory portion that is swappable into a region of the main memory.

FIG. 1 shows an Expanded Memory System (EMS). The system includes a one megabyte (1024K) physical memory 1 address space and a typically larger, for example up to 32 megabytes, expanded memory 2 address space. The physical memory 1 is coupled to and is directly accessible by a CPU that reads and writes the memory 1. The expanded memory 2 provides additional memory beyond a maximum addressable memory limit of the CPU. For example, microprocessors such as the 8086, 8088 and the 80286, operated in the real mode, are capable of physically addressing up to 1024K bytes of memory. The expanded memory is therefore accessed through a page frame 3 "window", or predetermined range of addresses, located within the directly accessible 1024K physical address range. In the example shown the page frame 3 occupies the range of addresses between 768K and 960K but this range of addresses need only be 64K bytes. In other embodiments the page frame 3 can occupy other ranges of addresses. The expanded memory 2 is partitioned into segments referred to as logical pages 4 each of which is typically 16K bytes in length. The logical pages 4 are accessed through the physical block of memory associated with the page frame 3. The page frame 3 contains a plurality, typically four, directly accessible physical pages 5, each of the physical pages 5 also being typically 16K bytes in length. In the presently preferred embodiment of the invention only one physical page 5 is used. It should be noted that the physical page(s) 5 can be mapped at address locations other than those illustrated, such as within the lower 640K of memory.

In operation the EMS maps a logical page 4 of expanded memory 2 into a particular one of the physical pages 5 of the page frame 3, thereby providing the CPU direct access to the logical page 4. The operation of one particular type of EMS that is particularly suitable for use with a presently preferred embodiment of the invention is set forth in a publication "Lotus TM /Intel TM- /Microsoft TM Expanded Memory Specification Version 4.0", dated Oct. 25, 1987, and commonly referred to as LIM EMS. Lotus is a trademark of Lotus Development Corporation, Cambridge, Mass., Intel is a trademark of Intel Corporation, Hillsboro, Oreg. and Microsoft is a trademark of Microsoft Corporation, Redmond, Wash.

The page frame 3 may be located above an address of 640K, that is, above a region 6 that is available for use by the operating system and application programs. The page frame 3 is typically located within a region having addresses predefined to contain video and other types of adapters. However, as was previously stated the page frame 3 may be located at other positions within the physical memory 1 address space.

It should be realized that EMS techniques other than LIM EMS are currently known and that the teaching of the invention is not to be construed to be limited to operation with only one particular type of EMS or with any one particular type of operating system. As will be made apparent the teaching of the invention is applicable for use in any system that employs paged access to memory not directly accessible by a CPU.

Figure 2:
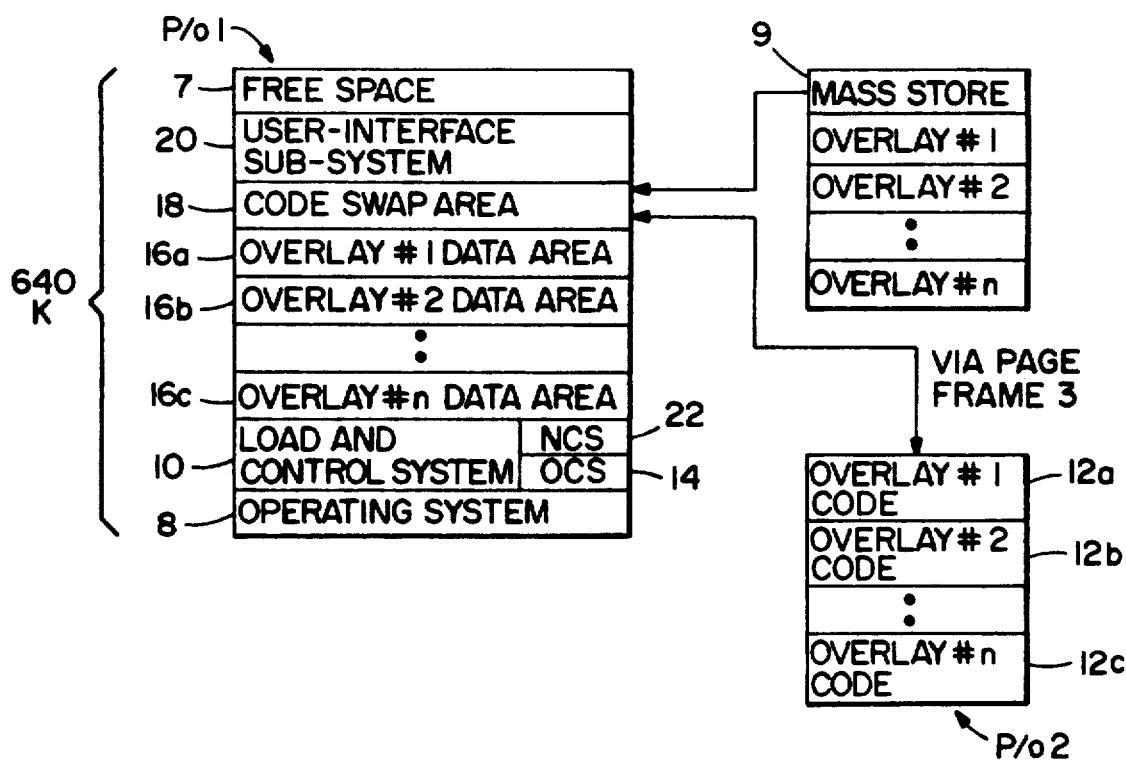
FIG. 2 shows in greater detail an organization of the memory in accordance with the invention.
Figure 3:
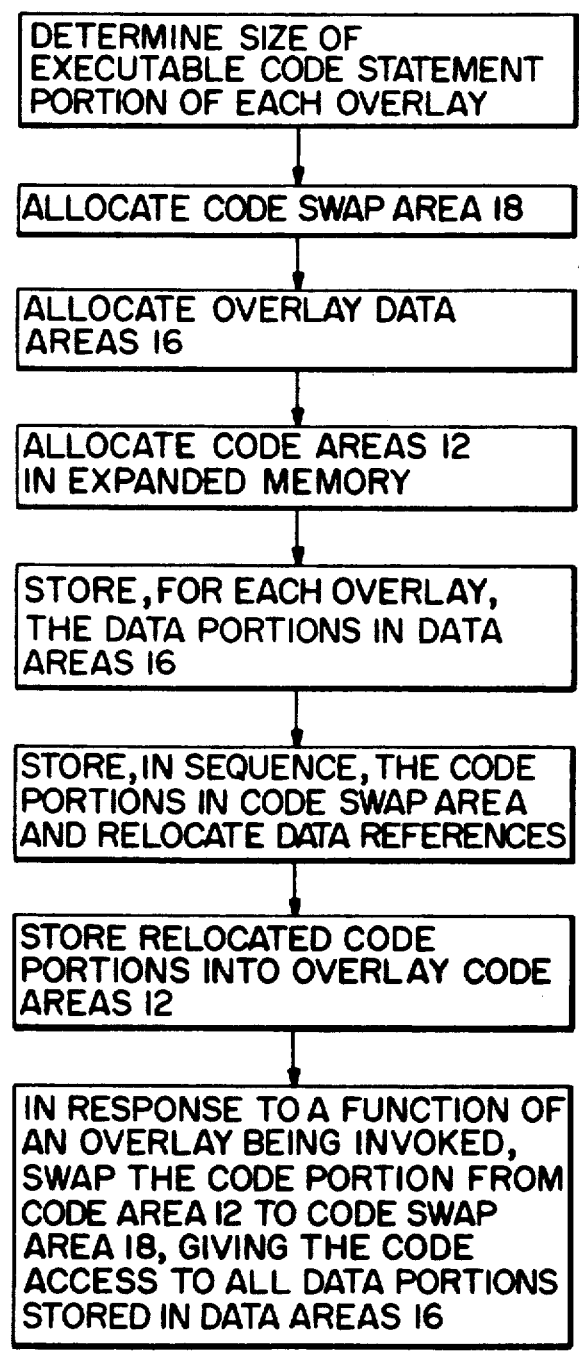
FIG. 3 is a flowchart depicting steps of a method of the invention.

FIG. 2, in conjunction with the flowchart of FIG. 3, illustrates in greater detail the operation of the invention and in particular shows the regions 6 and 7 of the physical memory space 1. At locations above the Operating System (OS) 8 a Load and Control System 10 is resident and determines which program modules, or Overlays, typically stored on a mass store 9 such as a disk, are to be loaded in support of a particular application program being run. This information is obtained from a Load List associated with an application, the Load List including a list of required Overlays. Each Overlay typically includes an executable code portion and a data portion.

It should be noted that as used herein the term "Overlay" is to be interpreted both in a traditional sense to mean a code Overlay, such as a module having a .OVL extension, as well as in a broader sense to mean a complete and independent program. As such, the invention provides a traditional code Overlay with the ability to call and return from a second Overlay. Also, the invention provides a capability for an entire program to be used as a swappable Overlay by separately maintaining the data portion of the program. It should be noted that the Overlays are typically in a form associated with files known as .EXE files, a file type having a structure known in the art. The structure of .EXE files is set forth in a publication entitled "Disk Operating System Technical Reference 6138536", February 1985, published by the IBM Corporation, Chapter 10, "EXE File Structure and Loading", the disclosure of which is incorporated herein by reference. Overlays may also be associated with extended .EXE file structures of a type employed with OS/2.

Space for a data structure, specifically an Overlay Control Structure (OCS) 14, is allocated by the Load and Control System 10 to maintain a record of a current state of all of the Overlays available to the system. The Overlay Control Structure 14 includes the following fields of data.

Overlay Status

These fields include information related to whether a particular overlay is swappable or resident and, for example, if the Overlay is swappable whether the Overlay is currently loaded within a Code Swap Area 18(to be described).

Overlay Name

These fields contain the file names associated with the Overlays so that the Overlays can be located on the mass store 9.

Overlay Initialization Entry Point

These fields contain the initialization entry point address associated with each Overlay. This entry point is employed when a swappable Overlay is first loaded and initialized, as will be described below.

Overlay Primary Entry Point

These fields contain an address of the functional entry point for each Overlay.

Overlay Termination Entry Point

These fields contain an address of a deinitialization entry point for each Overlay.

Overlay LIM Handle

These fields contain LIM handle information as specified by the LIM EMS.

Overlay LIM Page Count

These fields contain the number of 16K byte pages associated with each of the Overlay code segments stored within the expanded memory 2.

Overlay Resident Data Segment Address

These fields contain the address of the data segments associated with the data areas 16.

Overlay Code Size in Paragraphs

These fields contain the required size of each of the code segments in "paragraphs", or 16 byte increments. The values contained within these fields are employed to size the Code Swap Area 18 such that a maximum of 15 bytes of unused storage is allocated for the largest cod portion.

In the preferred embodiment of the invention two passes are made over the required swappable Overlays stored on mass store 9. During a first pass the Load and Control System 10 determines a size of a data portion and an executable code portion for each of the specified Overlays. The code segment and data segment information is available for .EXE programs at predetermined positions within the file. An amount of storage within main memory 1 that is required to store the largest Overlay code portion is also determined while performing this first pass size determination and is retained. The size information is stored in the Overlay Control Structure 14 within the Overlay Code Size in Paragraphs field.

In accordance with the invention separate areas (16a, 16b, 16c) are allocated in memory for the storage of the data associated with the Overlay code portions and a separate area is allocated for the code portion of a currently swapped-in Overlay. The region of memory allocated for storage of the Overlay code portion is the Code Swap Area 18, the Code Swap Area 18 having enough locations to store the largest of the Overlay code portions, in paragraphs, as previously determined. The segment addresses of the data areas 16 are stored in the Overlay Control Structure 14 within the Overlay Resident Data Segment Address fields, as previously described.

Separate areas 12a, 12b and 12c are allocated within the Expanded Memory 2 for each Overlay code portion. The size in pages and the LIM-related handle information for each of the code areas 12 is stored in the Overlay Control Structure 14 as previously described.

Next a second pass is run that loads by segments each Overlay identified as being required for the application. The code segments associated with the .EXE files on the mass store 9 are individually loaded into the code swap area 18. This loading is done independently of the Operating System 8 by the Load and Control System 10 according to the procedure set forth below.

From information contained within each required .EXE file the data segment(s) and code segments are identified, as is the information necessary to relocate the data segments. The data portion of a specified Overlay is copied into the pre-allocated area 16 within the memory 1. The code segments of the specified Overlay are individually loaded into the Code Swap Area 18. Any references to data within a particular code segment are re-located as a function of the address of the data segment of the associated data area 16.

The Overlay Initialization Entry Point, Overlay Primary Entry Point, and an Overlay Termination Entry Point are retrieved from the Overlay and stored within the corresponding data fields within the Overlay Control Structure 14.. In addition, the Overlay Initialization Entry Point is called to perform any required Overlay initialization and to store the address of the Load and Control System 10 within the Overlay.

The re-located and initialized Overlay code is written to the window 3 and then swapped into the Expanded memory 2 at the pre-allocated LIM area 12.

After so initializing all of the required Overlays control is subsequently passed to a User Interface Sub-System 20. This component invokes requested functions within the system by calling the Load and Control System 10 and providing the name of the function to be invoked and the parameters, if any, to be passed to the function.

Responsive to a request by the User Interface Sub-System 20 the Load and Control System 10 first checks the Overlay Control Structure 14 Overlay Status fields to determine if the Overlay containing the called function is a swappable or a resident Overlay and, if the Overlay is determined to be swappable, if the Overlay is currently loaded within the Code Swap Area 18. If the Overlay having the called procedure is not currently loaded the Load and Control System 10 swaps the Overlay code portion into the window 3 from the associated code area 12 and subsequently moves the code into the Code Swap Area 18 for execution. The Load and Control System 10 also updates the Overlay Control Structure 14 to indicate that the required Overlay no occupies the Code Swap Area 18. It should be noted that, in accordance with the invention, the data portion of this particular Overlay is already resident within one of the data areas 12 and that the data portion of the Overlay swapped out of the Code Swap Area 18 is also still resident.

The Load and Control System 10 subsequently passes control to the Overlay Primary Entry Point. The Overlay thereafter calls the specified procedure within the Overlay in a conventional manner.

In accordance with an aspect of the invention a call can be made from within a first swappable Overlay to a function within a second swappable Overlay. The following method accomplishes this action.

The Load and Control System 10 is invoked by the first Overlay through the User Interface Sub-System 20. Through the Overlay Control Structure 14 the Load and Control System 10 determines that both the calling Overlay and the called Overlay are swappable Overlays. A return address on a stack of the caller, the stack being located within the associated data area 16, is modified by the Load and Control System 10 to indicate an address within the Load and Control System 10. This is done to ensure that when the called function terminates the Load and Control System 10 is enabled to intervene to reload the first Overlay. The Load and Control System 10 also maintains the first Overlay identification and the original return address in a push-down stack referred to as a Nesting Control Structure (NCS) 22. The size of the Nesting Control Structure 22 determines a maximum number of nesting levels, that is, how many swappable Overlays calling other swappable Overlays can occur before the Nesting Control Structure 22 overflows. The Nesting Control Structure 22 is employed by the Load and Control System 10 to re-load the original calling Overlay before returning control to it at the return address.

As an example, an application has a plurality of swappable Overlays associated therewith, including a first and a second Overlay. The second Overlay includes I/O functions, such as a function that receives input characters from a source. The first Overlay includes a character buffer within the associated data area 16. The first Overlay invokes the character input function of the second Overlay, passing as a stacked parameter the data segment address of the character buffer. The second Overlay is swapped in, as previously described, and the character input function is invoked and executed to place characters into the buffer of the first Overlay. After the second Overlay terminates execution the first Overlay is swapped back in, using information from the NCS 22, by the Load and Control System 10 and continues execution. As can be seen, the invention makes possible such an interaction by providing that the data portion of the first swappable Overlay remain resident within CPU-accessible memory while the first Overlay is swapped out to EMS and during the time that the second Overlay is swapped in and is executing.

While the invention has been particularly shown and described with respect to a preferred embodiment thereof, it will be understood by those skilled in the art that changes in form and details may be made therein without departing from the scope and spirit of the invention.

Having thus described our invention, what we claim as new, and desire to secure by Letters Patent is:

1. In a data processing system having a CPU means, the system including Overlays each having an executable code portion and a data portion, a method of executing a plurality of Overlays with the CPU means, comprising the steps of:

prior to executing an Application that requires a plurality of Overlays, separating, with the CPU means, an executable code portion from a data portion of each of the required overlays;

storing the separated data portion of each of the required Overlays within a first memory means, the first memory means being directly addressable by the CPU means;

storing the separated executable code portion of each of the required Overlays within a second memory means, the second memory means not being directly addressable by the CPU means; and in response to the CPU means determining that the Application requires a specific one of the Overlays, swapping the required one of the Overlay executable code portions into the first memory means for execution by the CPU means so that, during execution of the executable code portion by the CPU means, the data portions of all of the required Overlays are directly addressable by the CPU means.

2. A method as set forth in claim 1 and including an initial step of allocating storage within the first memory means for a data structure having a plurality of data fields descriptive of the required Overlays.

3. A method as set forth in claim 2 and, subsequent to the step of allocating, the method further including a step of storing information within the plurality of data fields of the data structure for each of the Overlays, the step of storing information including the steps of, for each of the required Overlays;

storing a status indicative of whether the executable code portion of the Overlay is currently swapped into the first memory means;

storing a name associated with the Overlay;

storing an Overlay initialization entry point address;

storing an Overlay functional entry point address;

storing an Overlay termination entry point address;

storing information indicative of a number of storage locations within the second memory means required to store the executable code portion, the number of storage locations being determined by the CPU means; and storing information indicative of where the data portion of the Overlay is stored within the first memory means.

4. In a data processing system having code statement execution means coupled to main memory means for storing within the main memory means code statements and data employed by the code statements, the main memory means being directly addressable by the execution means, a particular group of code statements and data comprising an Overlay, a method for storing Overlays prior to execution thereof, comprising the steps of:

prior to executing an Application that requires a plurality of Overlays, determining, with the execution means, a size of an executable code statement portion for each of the required Overlays;

allocating a code area within the main memory means having a number of storage locations sufficient to accommodate a determined largest one of the code statement portions;

allocating a plurality of data areas within the main memory means for storing a data portion employed by each of the required Overlays;

allocating a plurality of code areas within an expanded memory means that is not directly addressable by the execution means, each of the plurality of code areas having a number of storage locations sufficient to accommodate the determined size of one of the executable code portions of one of the required Overlays; and for each of the required Overlays, in turn, performing the steps of, storing the data portion within the allocated data area of the main memory means;

storing the code portion within the allocated code area of the main memory means;

relocating within the stored code portion any references to data such that the references reflect an address of a data storage location within the associated allocated data area; and storing the code portion having relocated references to data into the allocated code area within the expanded memory means so that, during execution by the execution means of an executable code portion that is stored within the allocated code area of the main memory means, the data portions of all of the required Overlays are directly addressable by the execution means.

5. A method as set forth in claim 4 and including an initial step of, with the execution means, allocating storage locations within the main memory means for an Overlay Control Structure, the Overlay Control Structure having a plurality of data fields for storing information descriptive of the required Overlays.

6. A method as set forth in claim 5 including an additional step of retrieving specific descriptive data from the Overlay and storing the specific descriptive data in the Overlay Control Structure, the specific descriptive data including:

an Overlay Initialization Entry Point address;

an Overlay Primary Entry Point address; and an Overlay Termination Entry Point address.

7. A method as set forth in claim 6 and including a step of, for each of the allocated data areas, storing within the Overlay Control Structure an address of a data segment of the allocated data area.

8. A method as set forth in claim 5, and responsive to a request by a User Interface Sub-System to invoke a function associated with a specific one of the required Overlays, includes the steps of:

with a Load and Control System, testing the Overlay Control Structure to determine if the code portion of the specific Overlay is currently within the allocated code area of the main memory means; and if the code portion of the specific Overlay is not within the allocated code area of the main memory means, swapping the specific code portion from an allocated code area within the expanded memory means to the allocated code area of the main memory means; and updating the Overlay Control Structure to indicate that the code portion of the specific Overlay is currently within the allocated code area of the main memory means.

9. A method as set forth in claim 5 and further comprising the steps of:

calling, with a first Overlay, a function executed by a second Overlay, the first Overlay code portion being within the allocated code area of the main memory means and the second Overlay code portion being within the allocated code area within the expanded memory means;

the step of calling including the steps of, with an Overlay Load and Control means, modifying a first return address to the first overlay, the first return address being located on a first stack, so as to become a second return address, the second return address being a location that causes a return to the Overlay Load and Control means;

placing information within a second stack, the information specifying an identification of the first Overlay so that the first Overlay can be subsequently reloaded into the allocated code area of the main memory means, the information further specifying the first return address that was located on the first stack before the execution of the step of modifying;

swapping the second Overlay from the allocated code area of the expanded memory means into the allocated code area of the main memory means and executing the procedure; and swapping the first Overlay back into the allocated code area of the main memory means based upon the information within the second stack.

10. A method as set forth in claim 9 wherein the step of modifying is accomplished by accessing, with the Overlay Load and Control Means, the first stack within the allocated data area of the first Overlay.

11. A method as set forth in claim 8 wherein the step of testing includes an initial step of testing, with the Load and Control System, the Overlay Control Structure to determine if the function is executed by a swappable Overlay or by a resident Overlay.

12. A method as set forth in claim 9 wherein the step of invoking an Overlay Load and Control means includes the steps of testing, with the Overlay Load and Control means, the Overlay Control Structure to determine if the function is executed by a swappable Overlay or by a resident Overlay, and, if the Overlay is determined to be a swappable Overlay, testing the Overlay Control Structure with the Overlay Load and Control Means to determine if the code portion of the Overlay that executes the function is currently located within the allocated code area of the main memory means.

13. A method as set forth in claim 5 and including a step of storing the information descriptive of the required overlays within the Overlay Control Structure, the step of storing the information descriptive of the required overlays including, for each of the Overlays, the steps of:

determining with the execution means if the Overlay is a swappable Overlay and, if the Overlay is determined to be a swappable Overlay, determining if the code portion of the Overlay is currently located within the allocated code area of the main memory means;

storing within the Overlay Control Structure an Overlay Status indicative of at least whether the Overlay is a swappable Overlay and whether the Overlay code portion is currently loaded within the allocated code area of the main memory means;

storing a file name under which the Overlay is stored within a mass storage means;

storing an Overlay Initialization Entry Point address;

storing an Overlay Primary Entry Point address;

storing an Overlay Termination Entry Point address;

storing an Overlay Page Count indicative of the number of pages of the expanded memory means required to store the code portion of the Overlay; and storing an Overlay Resident Data Segment Address for indicating a segment address of the allocated data area of the Overlay.

14. A method as set forth in claim 4 wherein the step of determining a size is accomplished after a first step of accessing a mass storage means with the execution means, the mass storage means storing the Overlays when the Overlays are not required for execution, the first step of accessing reading code segment and data segment information from predetermined locations within files that store the Overlays.

15. A method as set forth in claim 14 wherein the steps of storing and the step of relocating are accomplished after a second step of accessing the mass storage means so as to read from the files the required Overlay executable code statement portions and data portions.

16. A method as set forth in claim 15 wherein the first and the second steps of accessing the mass storage means are accomplished by accessing .EXE-type files upon the mass storage means.

* * * * *